United States Patent [19]

Springer

[11] 4,096,732
[45] Jun. 27, 1978

[54] CAMERA TESTING METHODS AND APPARATUS

[76] Inventor: Barry R. Springer, 10301 Margarita Ave., Fountain Valley, Calif. 92708

[21] Appl. No.: 826,109

[22] Filed: Aug. 19, 1977

[51] Int. Cl.² .................................................. G03B 43/00
[52] U.S. Cl. .......................................... 73/5; 356/215
[58] Field of Search .............................. 73/5; 346/215

[56] References Cited

U.S. PATENT DOCUMENTS

| 3,498,723 | 3/1970 | Nichols | 73/5 |
| 4,031,739 | 6/1977 | Springer | 73/5 |

FOREIGN PATENT DOCUMENTS

| 1,096,813 | 12/1967 | United Kingdom | 73/5 |

*Primary Examiner*—S. Clement Swisher
*Attorney, Agent, or Firm*—Joseph E. Rusz; Willard R. Matthews, Jr.

[57] ABSTRACT

Effective shutter speed, focal plane exposure and film transport frame rate measurements are taken and displayed in user oriented format by a computing method and system for testing still and cinematic cameras. An analog signal pulse is generated that is responsive to the illuminance admitted to the camera focal plane during each camera shutter operation. Comparison of the analog signal pulse with various voltage threshold levels provides pulse period, overrange and underrange information. Cinematic frame rate is determined by dividing units by the time period, in seconds, between the beginnings of successive analog signal pulses; effective shutter speed is determined by dividing the peak amplitude value by the integrated value of the analog signal pulse; and focal plane exposure speed is determined by dividing the camera calibration constants by the integrated value of the analog signal pulse. The apparatus of the invention provides digital display of the test results including overrange and underrange errors, means for selecting between several modes of operation, and other features.

24 Claims, 5 Drawing Figures

| | SYSTEM OPERATING MODES / CYCLES | | | | |
|---|---|---|---|---|---|
| | CYCLE 1 | CYCLE 2 | CYCLE 3 | CYCLE 4 | DISPLAYED RESULT |
| MODE SS (SHUTTER SPEED) | INTEGRATE FOCAL PLANE ILLUMINANCE PULSE. DETECT AND HOLD PEAK ILLUMINANCE. | DIVIDE PEAK ILLUMINANCE BY INTEGRAL OF ILLUMINANCE PULSE | UPDATE AND LATCH DISPLAY | CLEAR AND REST SYSTEM | FRACTIONAL EFFECTIVE SHUTTER SPEED |
| MODE EX (EXPOSURE) | INTEGRATE FOCAL PLANE ILLUMINANCE PULSE DETECT AND HOLD PEAK ILLUMINANCE | DIVIDE CALIBRATION CONSTANT BY INTEGRAL OF ILLUMINANCE PULSE | UPDATE AND LATCH DISPLAY | CLEAR AND REST SYSTEM | AS A FILM EXPOSURE SPEED |
| MODE FR (FRAME RATE) | TIME FRAME-TO-FRAME START PERIOD | DIVIDE CONSTANT BY FRAME-TO-FRAME START PERIOD | UPDATE AND LATCH DISPLAY | CLEAR AND REST SYSTEM | CINEMATIC FRAME RATE |

CAMERA TESTING METHODS AND APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention relates to digital photographic electronics, and more particularly to a method and means for automatically testing cameras for effective shutter speed, focal plane exposure and film transport frame rates.

There has been increasing interest in the field of camera testing to develop more efficient, easier to use test instruments. The advent of digital electronics and the now readily available micrologic packages with complex processing capabilities has spurred the development of more automated and complex, yet easier to use test instruments. There has been a trend to develop such instruments where possible with digital display elements which are easily read and unambiguous in their meaning.

The most recent examples of the prior art as shown by U.S. Pat. No. 3,603,133 and Pat. No., 3,760,629 issued to Westhaver, and U.S. Pat. No. 3,913,376 issued to Scott, have brought the development of shutter testers into the realm of digital electronic processing.

Refinement of these camera testing systems and improvements in camera shutter speed measurement techniques are disclosed in the patent application of Barry R. Springer, Ser. No. 707,573 filed 22 July 1976 now U.S. Pat. No. 4,031,739 entitled "AUTORANGING METHOD AND SYSTEM FOR TESTING THE SPEEDS OF A CAMERA SHUTTER". Although the foregoing and other currently available camera testing systems represent substantial technological advancement over their predecessors there yet remains areas in which accuracy, convenience and ease of operation can be improved. In particular it is necessary in such devices to convert test results from photometric units such as millisecond shutter speed and millicandela-seconds per square meter exposure measurement to photographically oriented units such as practical shutter speed number and ASA equivalent film speed exposure which are the units used on the control settings of the camera. It is also necessary in such systems to set the display range for maximum precision. In testing the frame rate of cinematic cameras current procedures measure average frame rate and require the measurement of ten seconds of cinematic film transport operations to obtain high precision frame rate measurement. There currently exists the need, therefore, for camera test apparatus that will: (a) take, and display in user oriented format, shutter speed, focal plane exposure and film transport frame rate measurements; (b) autorange the display to maintain maximum precision in the data presentation; and (c) compute instantaneous cinematic camera frame rates. The present invention is directed toward satisfying that need.

SUMMARY OF THE INVENTION

The invention is a method and system for testing cameras which utilizes optoelectronic, analog and digital electronic means to measure certain camera performance parameters; perform digital computations on these measurements; and present test results in a user oriented format via a digital electronic display. The system measures effective shutter speed and focal plane exposure in still and cinematic cameras plus film transport frame rate in cinematic cameras. Measurements are facilitated by means of a photodetector placed in the focal plane of the camera to be tested. Computations are performed by means of voltage comparators, data conditioning and control flip-flops, timing multivibrators, digitally controlled analog switches, a peak detect and hold process, a voltage controlled oscillator, presettable counters, and testing mode, gain control, and signal switching means. Test results are presented by means of a digital electronic display in photographically oriented units instead of the engineering oriented units which present camera test instruments utilize. Shutter speed is presented as the fractional part of a second for which the camera shutter effectively operated (4.00 for example for a measured shutter speed of exactly one-fourth second). Exposure is presented as the equivalent ASA film speed which would have been correctly exposed by the illuminance pulse measured at the camera focal plane. Instantaneous cinematic frame rate (as opposed to average frame rate which currently available camera test instruments measure) is presented in frames per second. The system also includes autoreset after each test, autoranging control of the digital display, wide dynamic range in each illuminance gain range, over-range and underrange error display, and is generally designed to be used successfully by personnel relatively unskilled in precision photometric testing.

It is a principal object of the invention to provide new and improved methods and means for testing cameras.

It is another object of the invention to provide a new and improved method and means for taking camera effective shutter speed test measurements and presenting them in fractional speed format.

It is another object of the invention to provide a new and improved method and means for taking camera focal plane exposure test measurements and presenting them in ASA film speed format.

It is another object of the invention to provide a new and improved method and means for computing and displaying the instantaneous camera frame rate of a cinematic camera.

It is another object of the invention to provide a new and improved camera testing system having means for taking and displaying in user oriented format the effective shutter speed, focal plane exposure and film transport rates of still and cinematic cameras.

It is another object of the invention to provide a camera testing system of the type described including means for autoranging the digital display to maintain maximum precision in the data presentation.

These, together with other objects, features and advantages of the invention will become more readily apparent from the following detailed description when taken in conjunction with the illustrative embodiment in the accompanying drawings.

DETAILED DESCRIPTION OF THE PREFERRED EMBODIMENT

Figure 1:
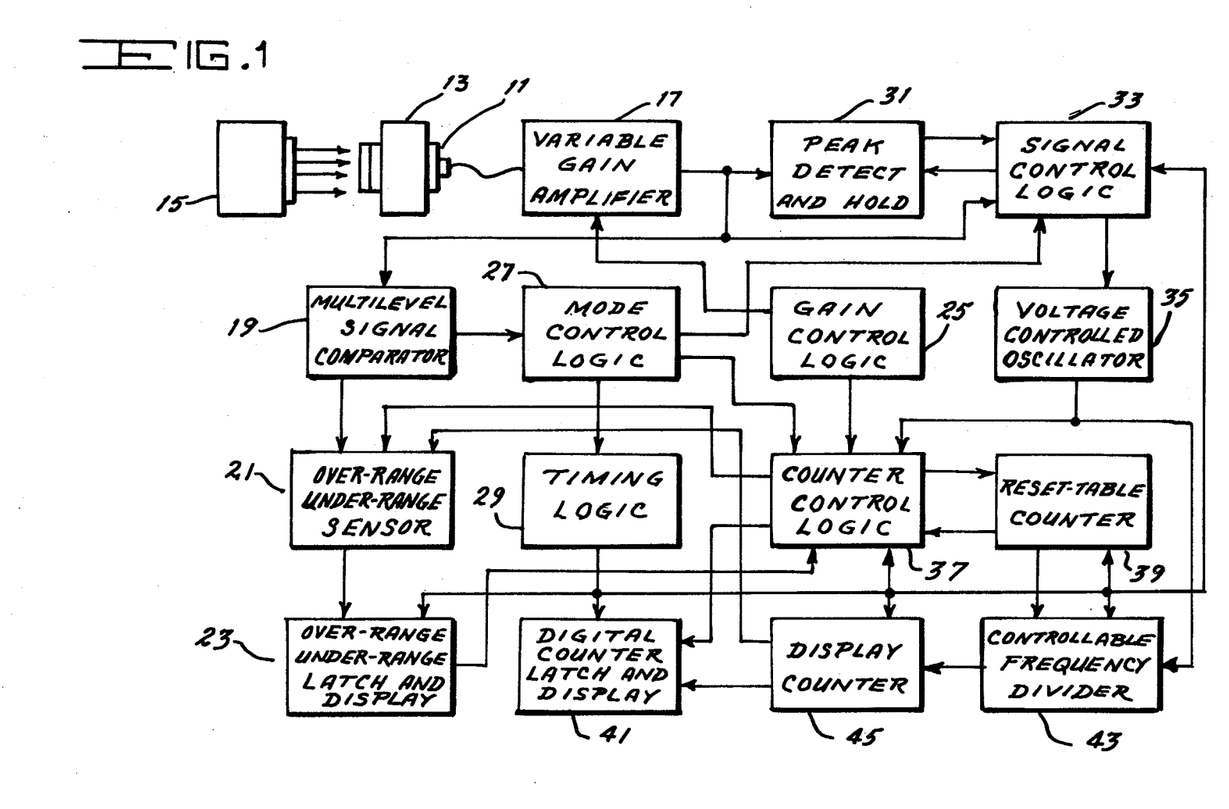
FIG. 1 is a block diagram of the camera testing system comprehended by the invention.
Figure 2:
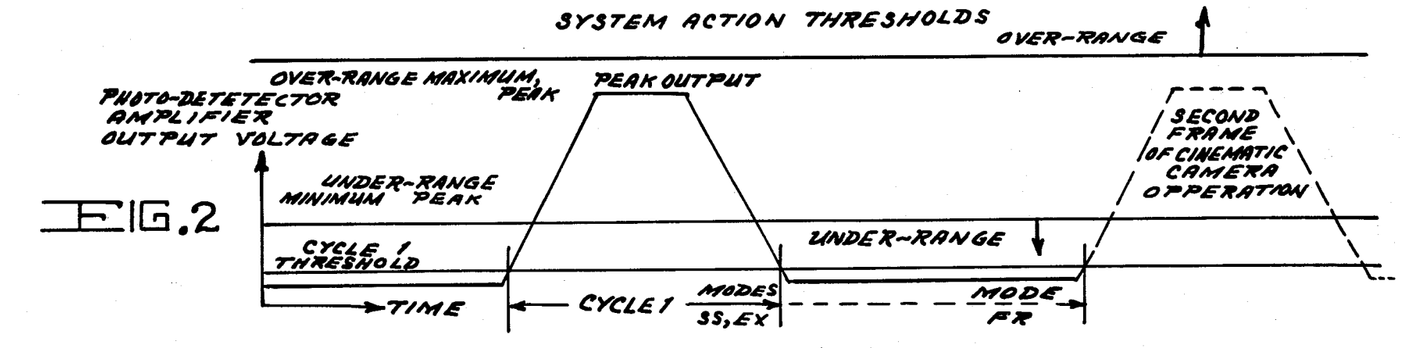
FIG. 2 illustrates the illuminance pulse waveform and threshold levels of the signals processed by the system of FIG. 1.
Figure 3:
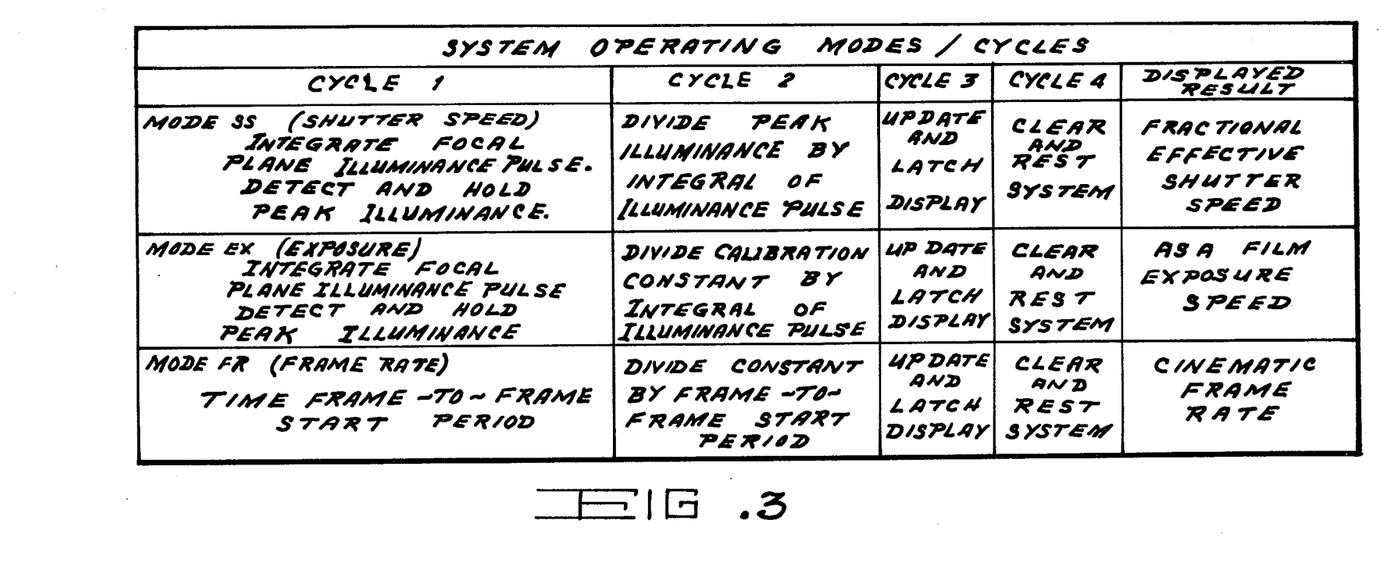
FIG. 3 is a table of system operating modes and cycles.

The objects of the invention are to provide a method and system for testing cameras which require a minimum of skill on the part of the test operator, requires a minimum of system adjustment prior to a test, provides information to the test operator to correct system gain in event the test configuration exceeds to dynamic limits of the system, resets automatically after a test, autoranges the digital display to maintain maximum display precision, and displays the test results in a format which is instantly recognizable and relates directly to the units utilized on the camera controls. To achieve these objects, a multimode test system is required which will measure camera performance, compute, and display the test results in the required user oriented format. FIG. 1 depicts such a system which embodies the object features and includes the functions and system interconnections which are required to practice the invention. For all modes of testing, a photodetector 11 is placed in the focal plane of the camera 13 to be tested by means of a fixture sized to match the format of the camera. During all tests, the camera is operated while directed at a light source 15. The light striking the photodetector generates a low level voltage which is proportional to the intensity of the light. The low level photodetector output is amplified by variable gain amplifier 17 to a voltage level suitable to interface with the other system elements. As the shutter of the camera is operated during a test, the voltage level output by amplifier 17 rises in direct proportion to the intensity of light striking the photodetector. A multilevel signal comparator 19 compares the rising amplifier 17 output voltage against several reference voltages and generates discrete control signals as each threshold is passed. As shown in FIG. 2, one of several internal system timing cycles is started when the lowest minimum threshold is passed. If the peak level does not exceed a second higher threshold, an underrange error condition is detected; and if a third higher threshold is exceeded, an overrange error condition is detected. These error conditions are sensed by overrange/underrange sensor 21 and retained and displayed after the test by overrange/underrange latch and display 23. The system has three operating modes and four timing cycles as shown in FIG. 3. The modes, selected manually by mode control logic 27, are effective shutter speed measurement, denoted mode SS; integrated focal plane exposure measurement, denoted mode EX; and instantaneous cinematic camera frame rate measurement, denoted mode FR. As shown in FIG. 2, the first of the system timing cycles, Cycle 1, starts when the amplifier 17 output level rises above the cycle 1 threshold and stops when the output falls back below the cycle 1 threshold again for modes SS and EX; and stops when the output rises back above the threshold a second time for mode FR. The remaining internal system timing cycles 2, 3, and 4 are of a fixed duration and are controlled by timing logic 29. The signal processing during cycles 1 and 2 varies from mode to mode as shown in FIG. 3. Cycle 3, and 4 processing is the same for all modes. Returning to FIG. 1, the output of amplifier 17 is simultaneously fed to peak detect and hold 31 and signal control logic 33. As the shutter opens to full aperture and then closes, peak detect and hold 31 holds the peak voltage level sensed and later feeds this voltage level to signal control logic 33 during cycle 2. Signal control logic 33 controls the input to voltage controlled oscillator (VCO) 35, which generates a pulse train with frequency linearly proportional to voltage input level. During cycle 1, signal control logic 33 selects the output of amplifier 17 to input to VCO 35 for modes SS and EX, and selects a constant input voltage level for mode FR. The VCO output pulse train is passed via counter control logic 37 to resettable counter 39, which counts up the total number of pulses output by the VCO during cycle 1. In the case of modes SS and EX, this count represents the integrated value of the time-illuminanace pulse sensed at the focal plane, and for mode FR represents the time duration between the starts of two successive exposure frames. Counter 39 is termed a resettable counter since as part of the method used to autorange the digital display, when this counter exceeds its maximum count capacity, counter control logic 37 resets its count to 1/10th of the maximum count capacity and shifts the decimal point position input by counter logic 37 to digital counter latch and display 41. When cycle 1 is completed, as sensed by the cycle 1 threshhold detector in signal comparator 19, timing logic 29 takes control of the system and initiates cycle 2, which is a precisely controlled 1 second duration cycle. During cycle 2, signal control logic 33 selects the output of peak detect and hold 31 to drive the VCO for mode SS, or applies a constant voltage level to the VCO for modes EX and FR. The output pulse train of the VCO is then divided down in frequency by controllable frequency divider 43, and counted up by display counter 45. The count achieved in resettable counter 39 during cycle 1 is used as the frequency division number for controlling frequency divider 43. If counter 45 exceeds its maximum count capacity during cycle 2, or if during cycle 1, counter 37 had exceeded its maximum number of autorange count up/reset cycles, overrange/underrange sensor 21 will also detect these conditions and provide an appropriate overrange error display after the test. At the completion of cycle 2, timing logic 29 generates a very short duration pulse, which is cycle 3, which updates the digital counter display 41 by latching the count in counter 45 and decimal point location from counter control logic 37, into the display. Following cycle 3, timing logic 29 generates another short duration pulse, which is cycle 4, which resets all counters to a zero count state, and resets peak detect and hold 31 to zero hold voltage. Overrange/underrange display 23 is not cleared at this time, however, so that the error condition may be noted by the test operator after the test. The error display is cleared at the start of the next cycle 1, whenever it occurs. At the completion of cycle 3, when the display is updated with the completed test results, the display for mode SS is a digital number which represents the fractional part of a second for which the shutter effectively operated. For mode EX, the display is a digital number which represents the ASA film speed number which would have been perfectly exposed by the time-illuminance pulse sensed at the focal plane of the camera. For mode FR, the display is the equivalent cinematic camera frame rate represented by the time duration between two successive exposure frames presented in frames per second. For all modes of measurement on cinematic cameras, the measurement, computation and display update process requires slightly in excess of one second. The display is therefore updated at a roughly once per second rate, which is beneficial since it allows the results of one test measurement to be adequately viewed by the test operator prior to being updated again.

Figure 4:
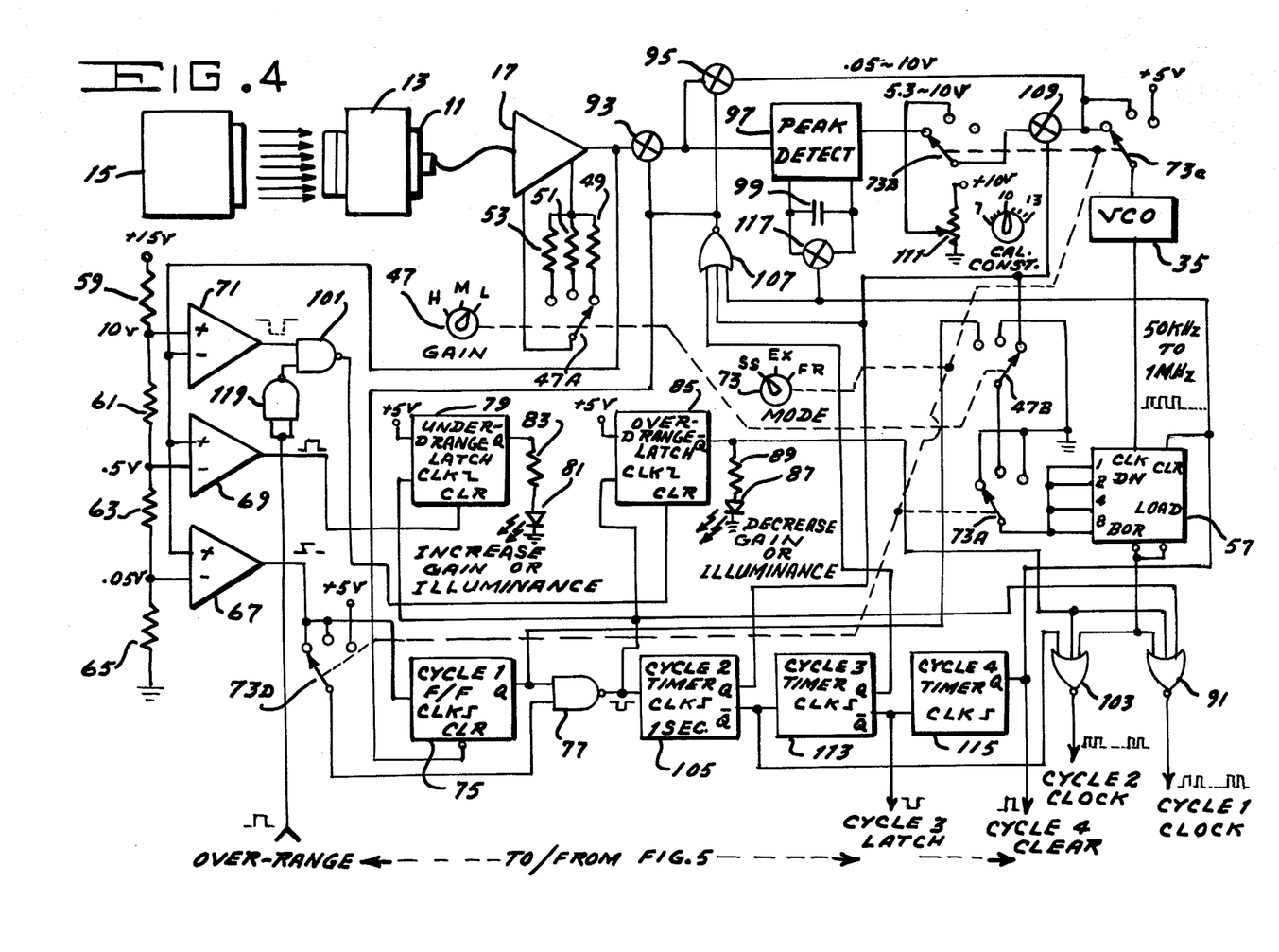
FIG. 4 is a detailed schematic diagram of the analog-to-digital conversion and switching circuits of the system of FIG. 1.
Figure 5:
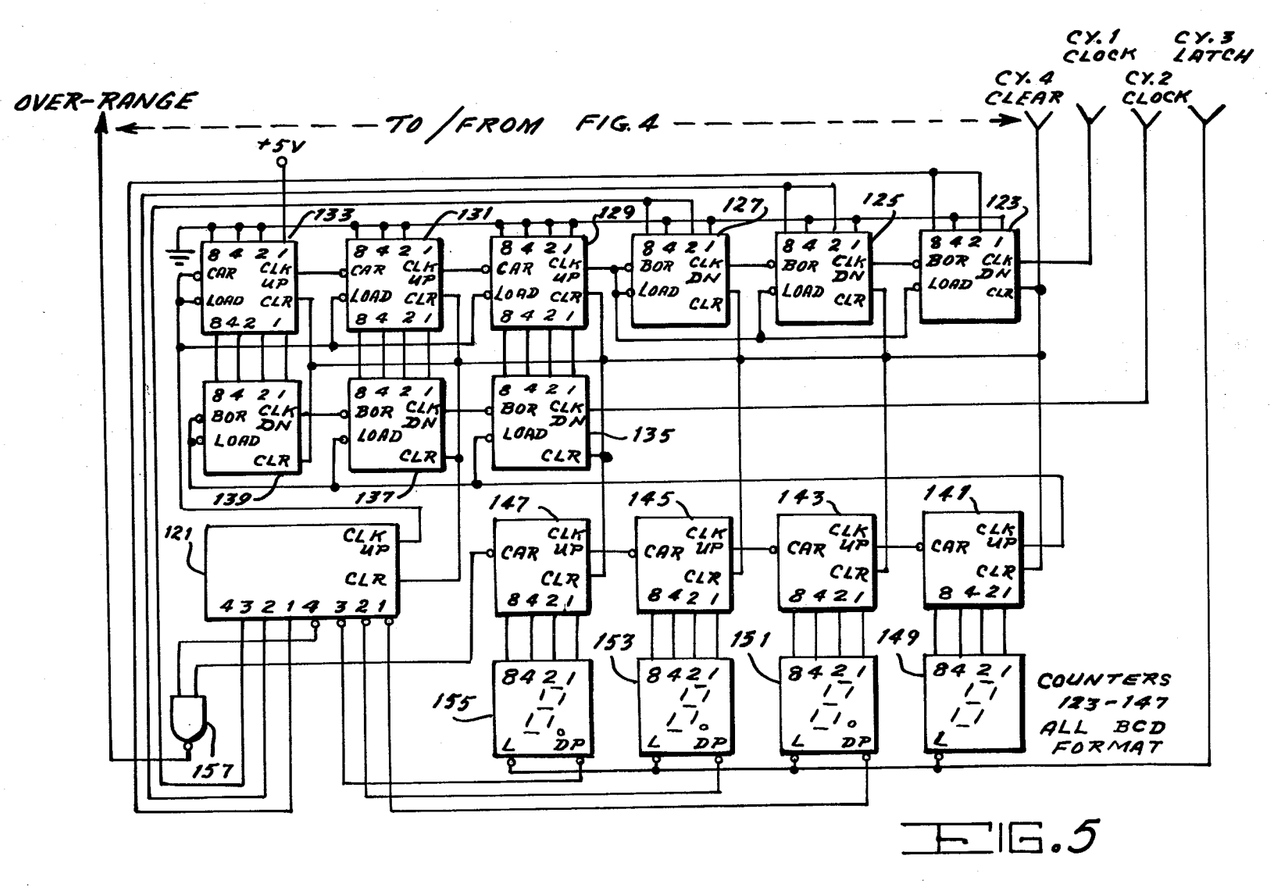
FIG. 5 is a detailed schematic diagram of the digital processing and display circuitry of the system of FIG. 1.

A more detailed schematic diagram of the measurement, computing, and display system for practicing the invention is depicted in FIGS. 4 and 5. FIG. 4 includes the circuitry for converting the analog illuminance level sensed by the photodetector to a digital pulse train including the means to sense the system action thresholds, switch signals according to mode and timing requirements and generally to process the signals as required to generate clock pulses required by the digital processing and display circuitry in FIG. 5. FIG. 5 includes the controllable up and down counters required to implement the computation of test results to produce the required format of digital display presentation and the means for implementing the autoranging control of the display to maintain maximum precision in the display. Starting now with FIG. 4, all camera tests require that a photodetector 11 be placed in the focal plane of the camera 13 to be tested. For all test, the camera must also be directed at a suitable light source 15; however, to be more specific the light source need only be sufficiently bright to cause the cycle 1 threshold to be exceeded during a test for mode FR tests, additionally it must present a uniform intensity across its light emitting surface for mode SS, and additionally must radiate at a controlled color temperature for most accurate test results in mode EX. The gain of variable gain amplifier 17 is controlled by segment 47A of double segment gain control switch 47 which is comprised of switch segments 47A and 47B. Segment 47A switches one of three resistors 49, 51 or 53 into the feedback circuit of amplifier 17 to produce selectable gain ratios of 1x (low gain), 15x (medium gain), or 225x (high gain). Gain switch segment 47B sets preset inputs to controllable frequency divider 57 through mode switch segment 73A. A frequency division ratio of 15 is selected in mode EX during cycle 1 for high gain range and during cycle 2 for low gain range. A division ratio of 1 is selected for all other combinations of mode, gain, and cycle. This controllable frequency divider and other such dividers utilized elsewhere within the system are presettable binary down counters with a feedback loop effected by connecting the borrow output back to the load preset input. By this connection, the counters count down from the preset input number to a zero count at which time a borrow pulse is output which causes the preset input number to be reloaded again. In this manner, one borrow output pulse is generated for each N input pulse, where N represents the binary number present on the preset inputs. In the case at hand, preset input numbers of zero or 15 were selected to match the amplifier gain ratios. A zero preset input has the same effect as a 1 input; both result in a divide by 1, or straight through operation. This method permits a wider dynamic range for each gain range than is available with most photometric test systems which are constrained to decade ratios by display methods which link gain control and decimal point display control. In the computation method herein presented, the decimal point is automatically positioned as required to maintain maximum precision in the display without regard to system gain range. The multilevel signal comparator is comprised of resistors 59, 61, 63, and 65 which produce reference voltages for voltage comparators 67, 69, and 71. A 0.05 volt reference level is used by cycle 1 threshold comparator 67 to generate a logic high level when the output of amplifier 17 exceeds the threshold level. A 0.5 volt reference level is used by underrange threshold comparator 69 to generate a logic high level when the amplifier 17 output exceeds this minimum acceptable peak level for high accuracy test computation. A 10 volt threshold is sensed by comparator 71 to generate a logic low if this maximum acceptable peak level is exceeded, which would otherwise lead to computational error from saturation of amplifier 17 or the input to VCO 35. The output of cycle 1 comparator 67 is input to segment 73D of mode selector switch 73 to select the action of single frame timing for modes SS and EX or frame to frame timing for mode FR. Mode selector switch 73 is comprised of switch segments 73A, 73B, 73C, and 73D which collectively configure the signal processing within the system as required for the three system modes. As a test starts and the threshold of cycle 1 comparator 67 is exceeded, its output rises to a logic high which toggles cycle 1 flip-flop 75 to Q high state. Since both inputs to NAND gate 77 are now high, its output goes to logic low state. This logic state transition triggers underrange latch 79 to Q high state which, for the instant, lights underrange light emitting diode (LED) display 81 through current limiting resistor 83. The gate 77 output transition also triggers overrange latch 85 to Q high state. Since overrange display LED 87 is driven by the Q output of latch 85 through resistor 89, an overrange error displayed from a previous test will be cleared at this time. The logic low output by gate 77 is also applied to NOR gate 91 during cycle 1 which, along with the Q low output of overrange latch 85, allows the output of VCO 35 through frequency divider 57 to be applied to the resettable counter in FIG. 5 to be described later. The output of gate 91 is clocking pulse train present only during cycle 1, and is therefore termed the cycle 1 clock. While the gating of the cycle 1 clock is controlled by gates 77 and 91, the pulse train character of the clock is generated by the output of amplifier 17 through digitally controlled analog switches 93 and 95 and through mode switch segment 73C to the input of VCO 35 for modes SS and EX. In mode FR, switch segment 73C selects a constant voltage level input to VCO 35. In cycle 1, the frequency division ratio of divider 57 is always 1 except for the high gain range in mode EX, where the ratio is 15. The high gain position of gain range selector switch 47B applies the output of cycle 1 flip-flop 75, which is high only during cycle 1, through mode selector switch segment 73A to set this division ratio. Also during cycle 1, amplifier 17 output voltage level is sensed by peak detector 97 which detects the peak voltage level reached and stores this voltage across peak hold capacitor 99. Underrange voltage comparator 69 is also sensing the peak voltage output by amplifier 17. As noted earlier, the start of cycle 1 toggles the underrange latch 79 to the Q high or underrange display state. If the peak threshold level of 0.5 volts required to trip comparator 69 to clear underrange latch 79 is not reached, the underrange error condition will remain to be displayed after the test. If the underrange minimum threshold is exceeded, however, latch 79 will be cleared and the underrange error condition display blanked. Overrange comparator 71 similarly monitors the peak output of amplifier 17. If the peak voltage exceeds the 10 volt reference level, comparator 71 output drops to logic low, causing the output of NAND gate 101 to rise to logic high state and to clear overrange latch 85 to Q high state. This will cause overrange LED 87 to light to warn the test operator of this condition and will also inhibit the passage of all clock pulses through gates 91 and 103 until the overrange latch is again cleared at the start of the next cycle 1. It should be noted that while an overrange condition inhibits the generation of cycle 2 clock for computation, an underrange condition will only be noted via an underrange display and will not inhibit cycle 2 clock. This difference is chosen because an overrange condition will likely result in an erroneous measurement of camera performance from saturation effects within the system, and therefore test results from such a condition must not be computed and displayed. An underrange condition, on the other hand, results in the peak to cycle 1 threshold ratio being reduced below a minimum 10 to 1 ratio chosen for best accuracy. Only in cases of extremely fast shutter speeds and very low peak to threshold ratios will the computation error become significant. For the majority of test measurements, an underrange error will still result in reasonable accuracy in the test measurement, computation, and display. Continuing with the signal processing in cycle 1, as the camera shutter begins to close, the output of amplifier 17 drops back below the cycle 1 comparator threshold level. In modes SS and EX, this signals the end of cycle 1, since this causes the output of gate 77 to rise back to logic high, terminating the passage of cycle 1 clock pulses through gate 91. In the case of mode FR, switch segment 73D applies a constant logic high level to gate 77 in place of the comparator 67 output. Cycle 1 continues for this mode, therefore, until another exposure frame starts, which causes another low to high logic transition from cycle 1 comparator 67 which toggles the cycle 1 flip-flop 75 back to Q low state which terminates cycle 1 for mode FR. The logic low to high transition output from gate 77 as cycle 1 terminates triggers a precision 1 second one shot multivibrator 105, termed the cycle 2 timer. The Q output of timer 105 is high during cycle 2 which, through NOR gate 107 turns off analog switches 93 and 95 and directly turns analog switch 109 on. In mode SS, switch 109 applies the peak voltage stored across peak hold capacitor 99 through switch segments 73B and 73C to the input of VCO 35. In mode EX, switch segment 73B applies to VCO 35 a constant voltage level selected by calibration constant potentiometer 111. This potentiometer is manually adjustable and is set by the test operator to a precalibrated setting for calibration numbers between 7 and 13. Manufacturers of automatic exposure cameras publish such a constant for each camera of their manufacture, which compensates for the field of view and weighted averaging of light sensed by the cameras illuminance detection system when operated against a uniform light source. This constant is set by the test operator to 10 if the actual constant is not known, which may result in some minor but not unacceptable errors in the exposure test. In mode FR, switch segment 73C applies a constant voltage level to VCO 35. The output of VCO 35 is applied to frequency divider 57. During cycle 2, the frequency division ratio of this divider is always 1, except for the low gain range in mode EX. The low gain position of gain range selector switch 47B applies the output of cycle 2 timer 105, which is high only during cycle 2, through mode selector switch segment 73A to set a divide by 15 frequency division ratio for the low gain range of mode EX. The output of frequency divider 57 is applied to NOR gate 103. If no overrange condition has occurred, then the Q output of timer 105 which is held low during cycle 2, enables gate 103 to pass the properly divided down VCO pulse train to a controllable frequency divider in FIG. 5 to be discussed later. Since the output of gate 103 is a clock pulse train present only during cycle 2, it is termed the cycle 2 clock. At the completion of cycle 2, the transition from logic low to high by the Q output of timer 105 triggers a very short duration one shot multivibrator 113, termed the cycle 3 timer, which generates a latch pulse to display latching circuitry in FIG. 5 to be discussed later. The completion of the latch pulse from timer 113 triggers another short duration one shot multivibrator 115, termed the cycle 4 timer, which sets the counters in FIGS. 4 and 5 back to zero count and discharges the voltage across peak hold capacitor 99 through analog switch 117. In addition to the four signals which are generated in FIG. 4 to be further processed in FIG. 5, one signal may be received back from the FIG. 5 circuitry if an overrange condition occurs in the counters described therein. This overrange pulse, if it occurs, is inverted by inverter 119 and applied through gate 101 to overrange latch 85. From the time cycle 1 is completed until cycle 4 is completed, the system is under the control of timing logic timers 105, 113, and 115. In the case of cinematic cameras, numerous exposure frames will occur during the slightly longer than 1 second computation period. To prevent these additional exposure frames from restarting additional cycle 1 operations, gate 107 senses the occurrence of timing cycles 2, 3, or 4 and simultaneously holds analog switches 93 and 95 in the off state as well as holding cycle 1 flip-flop 75 in the cleared state. This latter control means prevents the generation of additional cycle 1 pulses out of gate 77. At the end of cycle 4, control of analog switches 93 and 95 and flip-flop 75 is released and the start of next occurring exposure frame will trigger flip-flop 75 thus starting another cycle 1 measurement period. The clocking input to flip-flop 75 relys on a transition from logic low to high to change output states; thus if the clear control is removed in the middle of an exposure frame, the output of the flip-flop will remain quiescent. By this control method, the start of the next cycle 1 will be synchronous with the camera exposure frame and no erroneous asynchronous test measurements will occur in any mode for cinematic cameras.

FIG. 5 indicates the digital computing elements which combine the cycle 1 clock, the cycle 2 clock, the cycle 3 display latch, and the cycle 4 clear pulse to generate and update a digital display of the computed test results, including autoranging control of the display decimal point location, and generation of an overrange error pulse if the capacity of the counters involved is exceeded. At the start of cycle 1, all of the counters are clear and have a zero count. Counter 121 is a 4 bit ring counter with both true and complement outputs available for each count stage. The true outputs control the preset inputs of presettable down counters 123, 125 and 127 which are configured with feedback loops as is counter 57 to function as controllable frequency dividers. Since the preset inputs to these dividers is initially zero, the $y$ function initially in a divide by 1, or straight through mode. Therefore, the full frequency of the cycle 1 clock is applied directly to resettable BCD counters 129, 131, 133. These counters count up the VCO output pulse train to effectively integrate the time-illuminance pulse sensed by the photodetector at the camera focal plane. If the maximum count capacity for these BCD counters is exceeded, the carry output from counter 133 generates a carry pulse on the overrange count of 1000. This carry pulse causes the constant decimal number 100 to be loaded into the counter chain. The carry pulse also causes the autoranging control counter 121 to increment to a 1 count. The true output of the stage 1 bit now sets a frequency division number of 10 at the preset inputs to control frequency divider 123. Therefore resettable counter group 129, 131, 133 will count up to a 1,000 count, reset to 100 count, and then continue to count up but at 1/10 the former input frequency rate. The bit position in autorange counter 121 indicates the number of count up/reset cycles that have occurred as cycle 1 progresses. The complement output of counter 121 simultaneously controls the decimal point location for the display. At the completion of the cycle 1 clock, the cycle 2 clock will appear for 1 second at the input to controllable frequency divider divider group 135, 137, 139. The count contained within resettable counter group 129, 131, 133 will control the frequency division of the frequency divider group. The frequency divided cycle 2 clock is then applied to the display counter group comprised of cascaded BCD counters 141, 143, 145 and 147. At the completion of the cycle 2 count up period, the cycle 3 latch pulse transfers the display count and decimal point position to data latches within the four latch/decode/drive/display modules 149, 151, 153 and 155, which present the test results via 7 segment digital electronic displays. At the completion of the cycle 3 latch pulse, the cycle 4 clear pulse clears all counters back to a zero count state. The display count is already latched within the display modules, therefore the display of test results is maintained after the counters are cleared. If the count capacity of the display counter group is exceeded, a carry out pulse will be generated as the counter clocks over to zero count. Similarly, if the count up/reset overrange cycle count in counter 121 reaches 4, an overrange signal will be generated at the bit 4 output. Either of these overrange conditions will cause an overrange pulse to be generated out of NOR gate 157, which will be sensed by the overrange sensing circuitry in FIG. 4, and will terminate further computation as well as present an error display for the present cycle of computations.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. The method of testing a camera comprising the steps of
generating an analog signal pulse responsive to the illuminance admitted during each camera shutter operation,
defining the period of each said analog signal pulse by means of a set minimum signal amplitude threshold, and
determining the cinematic frame rate of said camera in frames per second as being the reciprocal of the time period, in seconds, between the beginning of two successive signal pulses.

2. The method of testing a camera comprising the steps of
generating an analog signal pulse responsive to the illuminance admitted during each camera shutter operation,
defining the period of each said analog signal pulse by means of a set minimum signal amplitude threshold,
integrating each said analog signal pulse,
detecting the peak amplitude value of each said analog signal pulse, and
determining the shutter speed for any shutter operation of said camera as being the ratio of the peak amplitude value to the integrated value of the analog signal pulse responsive to that shutter operation.

3. The method of testing a camera comprising the steps of
generating an analog signal pulse in response to the illuminance admitted during each camera shutter operation,
defining the period of each said analog signal pulse by means of a set minimum signal amplitude threshold,
integrating each said analog signal pulse, and
determining the ASA film speed exposure for any shutter operation as being the ratio of the camera film exposure speed calibration constant to the integrated value of the analog signal pulse responsive to that shutter operation.

4. The method of testing a camera defined in claim 2 including the step of
determining the cinematic frame rate of said camera in frames per second as being the reciprocal of the time period, in seconds, between the beginnings of two successive signal pulses.

5. The method of testing a camera defined in claim 3 including the step of
determining the cinematic frame rate of said camera in frames per second as being the reciprocal of the time period, in seconds, between the beginning of two successive signal pulses.

6. The method of testing a camera defined in claim 2 including the step of
determining the ASA film speed exposure for any shutter operation as being the ratio of the camera film exposure speed calibration constant to the integrated value of the analog signal pulse responsive to that shutter operation.

7. The method of testing a camera defined in claim 2 including the steps of
determining the cinematic frame rate of said camera in frames per second as being the reciprocal of the time period, in seconds, between the beginnings of two successive signal pulses, and
determining the ASA film speed exposure for any shutter operation as being the ratio of the camera film exposure speed calibration constant to the integrated value of the analog signal pulse responsive to that shutter operation.

8. Camera test apparatus comprising illuminance detector means for detecting and generating an analog signal pulse responsive to the illuminance admitted to the focal plane of a camera during each shutter operation thereof,
signal comparator means connected to receive said analog signal pulses and generate control voltages in response to analog signal pulse period defining and other set signal threshold levels,
timing means for measuring the time periods between the beginnings of successive analog signal pulses, and cinematic frame rate signal generating means adapted to develop frame rate signals responsive to the reciprocals of said time periods.

9. Camera test apparatus comprising illuminance detector means for detecting and generating an analog signal pulse responsive to the illuminance admitted to the focal plane of a camera during each shutter operation thereof,
  signal comparator means connected to receive said analog signal pulses and generate control voltages in response to analog signal pulse period defining and other set threshold levels,
  means for integrating each said analog signal pulse,
  means for detecting and retaining the peak value of each said analog signal pulse, and
  shutter speed signal generating means for generating shutter speed signals responsive to the dividend of the peak amplitude value divided by the integrated value of each said analog signal pulse.

10. Camera test apparatus comprising
  illuminance detector means for detecting and generating an analog signal pulse responsive to the illuminance admitted to the focal plane of a camera during each shutter operation thereof,
  signal comparator means connected to receive said analog signal pulses and generate control voltages in response to analog signal pulse period defining and other signal threshold levels,
  means for integrating each said analog signal pulse, and
  exposure speed signal generating means for generating exposure speed signals responsive to the dividend of the camera film exposure speed calibration constant divided by the integrated values of said analog signal pulses.

11. Camera test apparatus as defined in claim 9 including
  timing means for measuring the time periods between the beginnings of successive analog signals,
  cinematic frame rate signal generating means adapted to develop frame rate signals responsive to the reciprocals of said time periods, and
  an operating mode control means for selecting between shutter speed and cinematic frame rate modes of operation.

12. Camera test apparatus as defined in claim 10 including
  timing means for measuring the time periods between the beginnings of successive analog signals,
  cinematic frame rate signal generating means adapted to develop frame rate signals responsive to the reciprocals of said time periods, and
  an operating mode control means for selecting between exposure speed and cinematic frame rate modes of operation.

13. Camera test apparatus as defined in claim 9 including
  exposure speed signal generating means for generating exposure speed signals responsive to the dividend of the camera film exposure speed calibration constant divided by the integrated values of said analog signal pulse, and
  an operating mode control means for selecting between shutter speed and exposure speed modes of operation.

14. Camera test apparatus as defined in claim 9 including
  timing means for measuring the time periods between the beginnings of successive analog signals,
  cinematic frame rate signal generating means adapted to develop frame rate signals responsive to the reciprocals of said time periods,
  exposure speed signal generating means for generating exposure speed signals responsive to the dividend of the camera film exposure speed calibration constant divided by the integrated values of said analog signal pulses, and
  an operating mode control means for selecting between shutter speed, cinematic frame rate and exposure speed modes of operation.

15. Camera test apparatus as defined in claim 8 wherein said cinematic frame rate generating means comprises
  means for generating a first train of clock pulses during the time period between the beginnings of two successive analog signal pulses,
  means for counting said first train of clock pulses,
  means for generating a second train of clock pulses,
  means for dividing the frequency of said second train of clock pulses by the accumulated count of said first train of clock pulses, and
  means for counting the divided second pulse train clock pulses.

16. Camera test apparatus as defined in claim 15 including means for automatically displaying the cinematic frame rate as a function of the counted divided second pulse train.

17. Camera test apparatus as defined in claim 9 wherein said shutter speed signal generating means comprises
  means for generating a first train of clock pulses for which the instantaneous frequency is proportional to the instantaneous intensity of the analog signal pulse,
  means for counting said first train of clock pulses,
  means for generating a second train of clock pulses for which the frequency is proportional to the peak intensity of the analog signal pulse,
  means for dividing the frequency of said second train of clock pulses by the accumulated count of said first train of clock pulses, and
  means for counting the divided second train of clock pulses.

18. Camera test apparatus as defined in claim 17 including means for automatically displaying the effective shutter speed as a function of the count of the divided second train of clock pulses.

19. Camera test apparatus as defined in claim 10 wherein said exposure speed signal generating means comprises
  means for generating a first train of clock pulses for which the instantaneous frequency is proportional to the instantaneous intensity of the analog signal pulse,
  means for counting said first train of clock pulses,
  means for generating a second train of clock pulses for which the frequency is proportional to the camera calibration constant,
  means for dividing the frequency of said second train of clock pulses by the accumulated count of said first train of clock pulses, and
  means for counting the divided second train of clock pulses.

20. Camera test apparatus as defined in claim 19 including means for automatically displaying the film speed number as a function of said counted divided second train of clock pulses.

21. A system for measuring the effective shutter speed, effective exposure and the frame rate of a camera comprising
illuminance detecting means positioned in the focal plane of said camera,
a multilevel signal comparator fed by said illuminance detecting means,
a mode control logic circuit having a manual input adapted to select the operating mode of the system from between effective shutter speed, effective exposure and camera frame rate, said mode control logic circuit being fed by said multilevel signal comparator,
a timing logic circuit fed by said mode control logic circuit,
a peak illuminance signal detect and hold means fed by said illuminance detecting means,
a signal control logic circuit feeding and fed by said peak illuminance signal detect and hold means and fed by said mode control logic means and by said timing logic circuit, and further receiving a manual input adapted to select and set the camera calibration constant,
a voltage controlled oscillator fed by said signal control logic circuit,
a controllable frequency divider fed by said voltage controlled oscillator and said timing logic circuit,
a resettable counter feeding said controllable frequency divider and fed by said timing logic circuit and said mode control logic circuit,
a counter control logic circuit feeding and fed by said resettable counter, said counter control logic further being fed by said timing logic circuit and said voltage controlled oscillator,
a display counter fed by said controllable frequency divider and said timing logic circuit, and
a digital counter latch and display means fed by the display counter, the counter control logic circuit and the timing logic circuit.

22. A system for measuring the effective shutter speed, effective exposure and the frame rate of a camera as defined in claim 21 wherein said illuminance detecting means comprises a photodetector.

23. A system for measuring the effective shutter speed, effective exposure and the frame rate of a camera as defined in claim 22 including
a variable gain amplifier interposed between said photodetector and said peak illuminance signal detect and hold means, said signal control logic circuit and said multilevel signal comparator, and
a gain control logic circuit feeding said variable gain amplifier and said counter control logic circuit.

24. A system for measuring the effective shutter speed, effective exposure and the frame rate of a camera as defined in claim 23 including
an overrange/underrange sensor fed by said multilevel signal comparator, said counter control logic circuit, and said display counter, and
an overrange/underrange latch and display fed by said overrange/underrange sensor and said timing logic circuit.

* * * * *